United States Patent
Thomas, III et al.

(10) Patent No.: US 7,123,446 B2
(45) Date of Patent: Oct. 17, 2006

(54) REMOVABLE CARTRIDGE RECORDING DEVICE INCORPORATING ANTIFERROMAGNETICALLY COUPLED RIGID MAGNETIC MEDIA

(75) Inventors: Fred C. Thomas, III, Ogden, UT (US); David W. Griffith, Layton, UT (US)

(73) Assignee: Iomega Corporation, San Diego, CA (US)

(*) Notice: Subject to any disclaimer, the term of this patent is extended or adjusted under 35 U.S.C. 154(b) by 392 days.

(21) Appl. No.: 10/739,504

(22) Filed: Dec. 18, 2003

(65) Prior Publication Data
US 2005/0135009 A1 Jun. 23, 2005

(51) Int. Cl.
G11B 7/241 (2006.01)
G11B 23/03 (2006.01)
G11B 33/14 (2006.01)

(52) U.S. Cl. ............... 360/133; 360/97.01; 360/97.02

(58) Field of Classification Search ............ None
See application file for complete search history.

(56) References Cited

U.S. PATENT DOCUMENTS 6,280,813 B1 * 8/2001 Carey et al. ............ 428/828
6,490,242 B1 * 12/2002 Bonn et al. ............ 720/738
6,572,989 B1 * 6/2003 Bian et al. ............ 428/832
6,635,367 B1 * 10/2003 Igarashi et al. ............ 428/828
6,899,959 B1 * 5/2005 Bertero et al. ............ 428/611
6,964,819 B1 * 11/2005 Girt et al. ............ 428/828
2003/0152805 A1 * 8/2003 Bertero et al. ............ 428/692
2003/0193886 A1 * 10/2003 Kim et al. ............ 369/291

FOREIGN PATENT DOCUMENTS

JP 7-312054 A * 11/1995
JP 10-149539 A * 6/1998

* cited by examiner

*Primary Examiner*—Jefferson Evans

(57) ABSTRACT

A removable magnetic data storage cartridges incorporates antiferromagnetically coupled (AFC) media and may be used with a data drive to push the capacity point of removable hard platter based magnetic storage to 35 GB for a single platter 2.5" form factor product. The removable magnetic data storage cartridges incorporating AFC media represents an equivalent increase in the areal density of removable magnetic data storage cartridges on the order of 13×.

12 Claims, 2 Drawing Sheets

REMOVABLE CARTRIDGE RECORDING DEVICE INCORPORATING ANTIFERROMAGNETICALLY COUPLED RIGID MAGNETIC MEDIA

TECHNICAL FIELD

This invention relates to removable physical storage, and more particularly to removable cartridge incorporating antiferromagnetically coupled rigid magnetic media.

BACKGROUND

The demand for removable magnetic cartridge data storage devices with larger and larger capacities and higher transfer rates continues to grow with the capacity of other forms of data storage such as the hard disk drive (HDD). Industrywide, HDD capacity has grown an average of 60 percent per year since 1991. Software applications, particularly those using audio and video, continue to drive the increasing demand for greater storage capacity. Video is the major capacity driver for the HDD industry today.

In the future, the Internet is expected to play an increasing role in the growth of multimedia applications that require large HDD capacities. Today, most Web sites employ text and static graphics to exhibit their content. But, as the use of broadband communication technologies such as integrated services digital network (ISDN), asymmetric digital subscriber line (ADSL), and cable modems increases, the use of bandwidth-intensive audio/video technologies on the Internet will also increase. This greater Internet access will, in turn, stimulate the development of new graphics applications and programs that will generate additional demand for HDD capacity.

Examples of the kinds of applications that are expected to grow in popularity and further push the requirements of removable cartridge data capacity envelope are:

E-commerce—The online shopping experience will include greater use of audio and video (including 3D video) content. For example, new car shoppers will be able to view full-motion audio/video (AV) files that will provide a fairly accurate idea of an automobile's performance characteristics under different driving conditions. The AV file will be downloadable for later viewing and comparison with other automobile files. Similarly, future mall shoppers will be able to browse virtual shopping centers and digitally "handle" the virtual merchandise by picking 3D objects and manipulating them on their computer screens. For example, furniture shoppers might furnish virtual rooms in their homes by viewing them in 3D perspective.

Photo/Video/Audio Libraries—With the advent of digital cameras and camcorders with digital audio capabilities, PC users can use their HDDs as virtual libraries of photos and videos. The resulting storage requirement will be extensive. With compression, 1,000 reasonably high-resolution images can be stored in 1 GB of disk space. Good-quality compressed video such as Video Home System (VHS) or Moving Picture Experts Group level 1 (MPEG-1) requires about 1.5 Mbps, or about 5.5 gigabits per hour (Gb/hr). High-Definition Television (HDTV) or the equivalent MPEG-2 will increase required storage to approximately 10 Gb/hr.

AV e-mail—Unlike today's primarily text-only e-mail, most e-mail messages will be able to support full-motion video and audio content. Many of these large-capacity messages will be downloaded to the HDD for later action. Depending on file length and file compression level, AV e-mail files will typically range in size from 2 MB to 15 MB or greater.

Education—As more universities and other professional educational institutions offer online programs, multimedia applications will become widespread. Media clips will be included in material sent to students to be downloaded for individual study, and medical doctors will receive surgical updates on new procedures in full-color video and audio.

Corporate Communications and Training—Currently, these applications are primarily intranet in nature, and include such activities as employee communications, executive updates, training modules, and so forth. Content is generally text and static graphic images. However, as streaming media technology improves, AV modules will be sent over the company network and downloaded to the user's HDD for later study at the user's convenience.

The magnetic recording layer on removable magnetic data storage drives has been what is termed "sputtered thin film magnetic media". This has been the principal rigid platter media type for approximately the past 25 years. Prior to its invention oxide and plated media were the state of the art for rigid disk based magnetic recording devices.

Prior art sputtered thin film magnetic media is typically coated with multiple layers. Most disks are aluminum or glass, plated with a nickel-phosphorous layer, followed by chrome or chrome alloy. The chrome layer is followed by the magnetic layer, usually a cobalt alloy, which is capped by a topcoat, a layer to provide protection against corrosion and wear from the head. A lubricant is finally applied to the disk to further reduce friction between the head and disk.

Companies such as Iomega Corporation have previously built and brought to market removable cartridge recording devices incorporating rigid magnetic media incorporating sputtered thin film magnetic recording layers. The Iomega Jaz 1 GB and Jaz 2 GB are two examples of such products. To accommodate the demand for greater storage capacity, a removable magnetic data storage cartridge having much greater storage and areal densities is needed.

SUMMARY

A removable magnetic data storage cartridges incorporates antiferromagnetically coupled (AFC) media and may be used with a data drive to push the capacity point of removable hard platter based magnetic storage to 35 GB for a single platter 2.5" form factor product. The removable magnetic data storage cartridges incorporating AFC media represents an equivalent increase in the areal density of removable magnetic data storage cartridges on the order of 13×.

DESCRIPTION OF DRAWINGS

These and other features and advantages of the invention will become more apparent upon reading the following detailed description and upon reference to the accompanying drawings.

DETAILED DESCRIPTION

Figure 1:
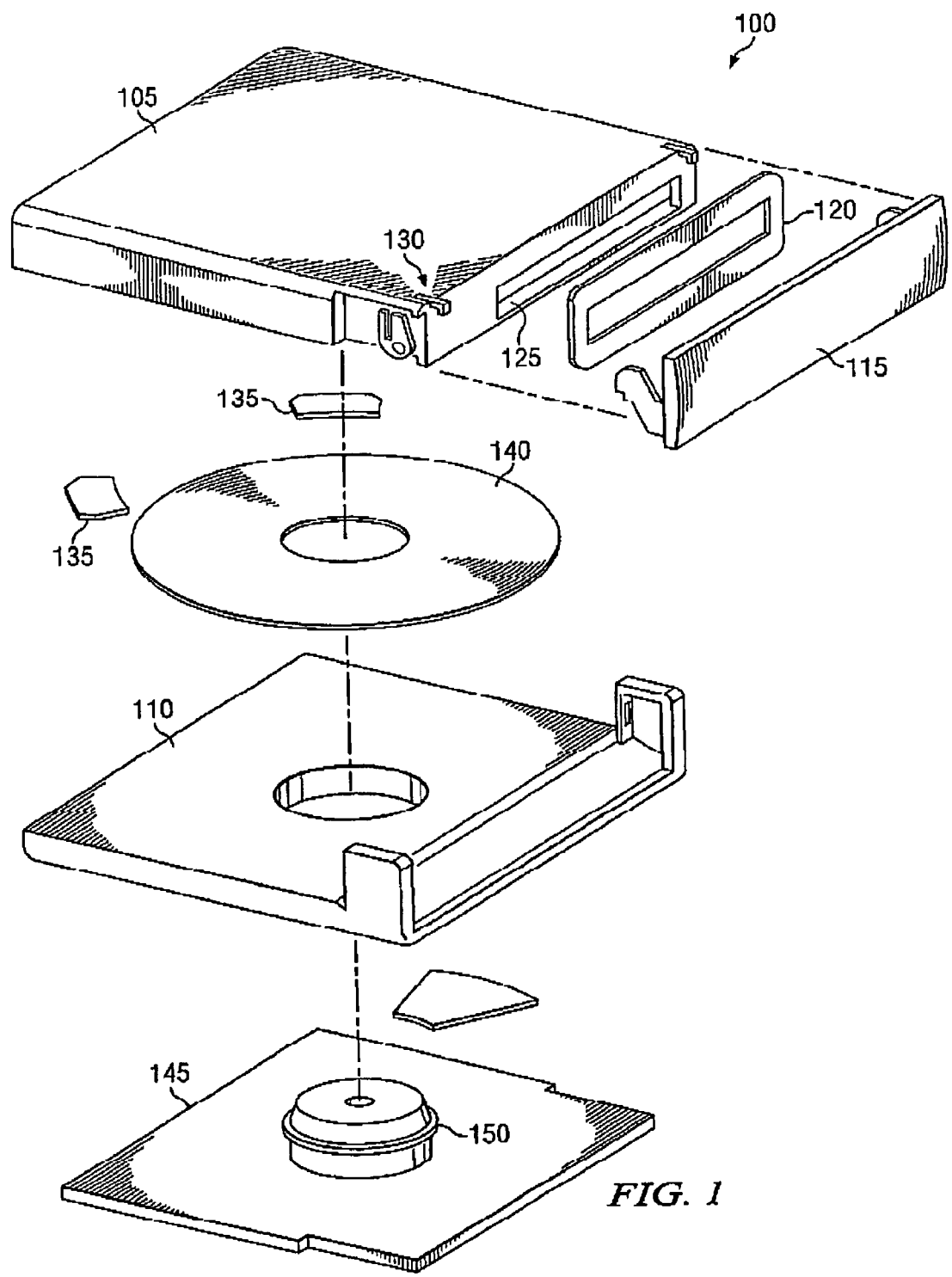
FIG. 1 illustrates a removable magnetic data storage cartridge incorporating AFC technology.

FIG. 1 illustrates one embodiment of the invention. This new ultra-high capacity removable cartridge 100 magnetic disk drive incorporates the use of an antiferromagnetically coupled (AFC) media recording layer 140. The removable cartridge 100 includes a cartridge top 105 and a cartridge bottom 110. The cartridge top 100 includes a physical access port 125 for read/write heads to access the AFC recording layer 140. An access port shutter 115 covers the physical access port 125 when not in use. An elastomeric seal 120 is positioned between the access port shutter 115 and the access port to prevent impurities from entering the cartridge 100. Use of elastomeric seals 120 on the cartridge 100 and on the drive unit isolates contamination sensitive elements in unit (media and heads) from contaminated ambient air. An example can be found in the co-pending application entitled "Enhanced Airflow Conditioning System for Removable Data Storage Cartridge," filed Nov. 15, 2002, which is incorporated by reference herein.

The cartridge 100 includes an electrical connector 130. The use of an electrical connector 130 on the data storage cartridge 100 may be used for linkage to a solid state device in cartridge 100. An example can be found in the co-pending application entitled "Method and Apparatus for Electrically Coupling Components in a Removable Cartridge" Ser. No. 09/590,508, filed Jun. 9, 2000, which is incorporated by reference herein.

The cartridge 100 also includes a motor base plate 145 which houses a media rotational motor 150. Location of the media rotational motor 150 in the removable cartridge 100 rather than in drive reduces media radial and vertical run-out and hence makes the difficult servo task of data track following after cartridge interchange between drive devices easier. An example can be found in the co-pending application entitled "Removable Cartridge with Sealed Motor Hub and Motor Bearing in Cartridge" filed Nov. 15, 2002, which is incorporated by reference herein.

Additionally, the cartridge 100 may contain cartridge environmental control elements 135 which assist in removing impurities from the cartridges. Examples of environmental control elements 135 include absorbent filters to control the relative humidity and eliminate corrosive gases. The absorbent filters may be made with materials such as activated carbon, impregnated activated carbon, or silica gel. The environmental control elements 135 may be integrated into the removable cartridge 100 in the form of absorbent breather filter, absorbent recirculation filter, and/or absorbent pouches. The environmental control elements 135 may also include nuclear material emitting Alpha or Beta particles places proximate to electrostatic discharge (ESD) sensitive components or electrical paths leading to such ESD sensitive components. The nuclear particles ionize the surrounding air molecules. The ionized air molecules recombine with the ions of a static charge neutralizing the charge and thus eliminating or reducing the potential of ESD damage to the components.

Figure 2:
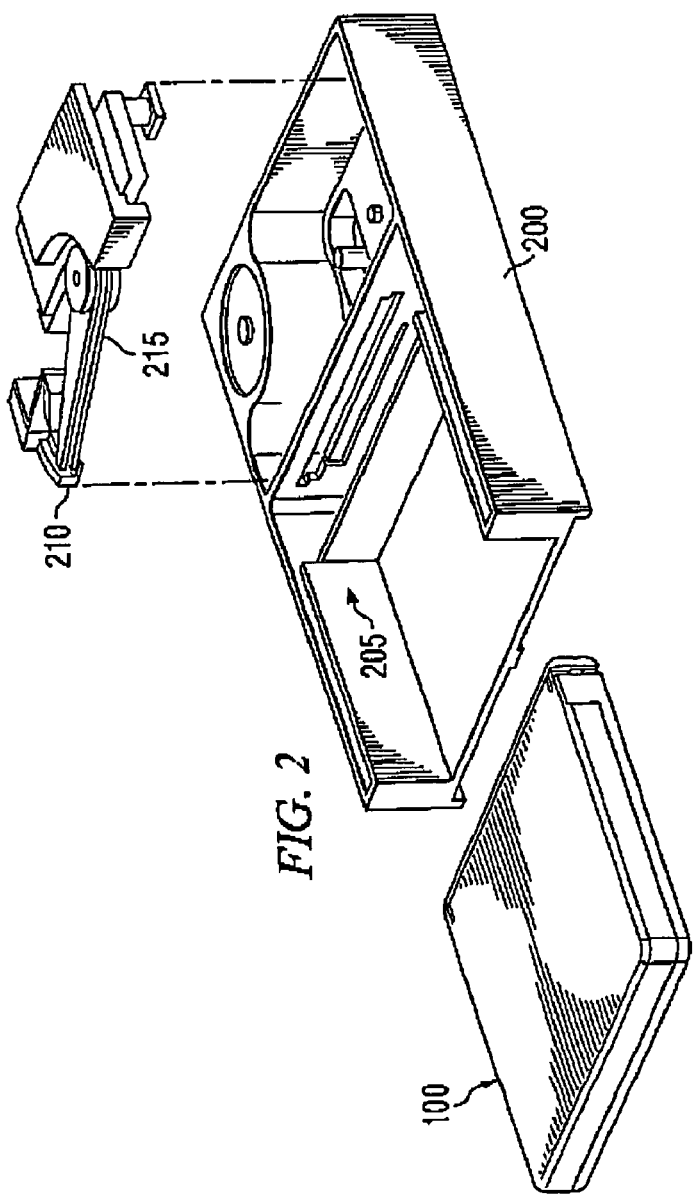
FIG. 2 illustrates removable media system incorporating the removable magnetic data storage cartridge of FIG. 1.

FIG. 2 illustrates a drive 200 which receives the removable cartridge 100 of FIG. 1. The drive 200 includes seal mating means 205 which combine with the seal 120 to create an airtight connection between the drive 200 and the cartridge 100. The drive 200 also includes a head actuator assembly 215 which transports read/write heads 210 through the physical access port 125 to interact with the AFC recording layer 140. The read/write heads 210 may incorporate gigantic magneto-resistive (GMR) magnetic head read elements. Further, the read/write heads 210 may ride on a head/suspension load and unload ramp in the removable data storage cartridge (not shown). Inclusion of a portion to the head/suspension load and unload ramp in the removable data storage cartridge 100 makes the mechanical task of ramp alignment with interchange of data storage cartridges 100 much easier and accurate. An example can be found in the co-pending application entitled "Bifurcated Load Ramps for Removable Cartridge", filed Nov. 15, 2002, which is incorporated by reference herein.

The AFC recording layer 140 may incorporate the use of a glass substrate for the media. Glass substrates provide about a 3× improvement over aluminum media to shock as well as head/media slap robustness. However, the AFC recording layer 140 may also be used with a plastic or flexible substrate. The AFC recording layer 140 may also use multilayer interactions and permits longitudinal recording to achieve a future data density of 100 gigabits/inch$^2$— four times the data density of previous products—without suffering from the projected data loss due to thermal instabilities. Antiferromagnetically coupled (AFC) media delays for several years the impact of superparamagnetism in limiting future areal density increases.

The superparamagnetic effect originates from the shrinking volume of magnetic grains that compose the hard-disk media, in which data bits are stored as alternating magnetic orientations. To increase data-storage densities while maintaining acceptable performance, designers have shrunk the media's grain diameters and decreased the thickness of the media. The resulting smaller grain volume makes them increasingly susceptible to thermal fluctuations, which decreases the signal sensed by the drive's read/write head. If the signal reduction is great enough, data could be lost in time to this superparamagnetic effect.

Historically, disk drive designers have had only two ways to maintain thermal stability as the media's grain volume decreases with increasing areal density: 1) Improve the signal processing and error-correction codes (ECC) so fewer grains are needed per data bit, and 2) develop new magnetic materials that resist more strongly any change to their magnetization, known technically as higher coercivity. But higher coercivity alloys also are more difficult to write on. While improvements in coding and ECC are ongoing, AFC media is a major advancement because it allows disk-drive designers to write at very high areal densities but is much more stable than conventional media.

Conventional disk media stores data in only one magnetic layer, typically of a complex magnetic alloy (such as cobalt-platinum-chromium-boron, CoPtCrB). AFC media is a multi-layer structure in which two magnetic layers are separated by an extraordinarily thin—just three atoms thick—layer of the nonmagnetic metal, ruthenium. This precise thickness of the ruthenium causes the magnetization in each of the magnetic layers to be coupled in opposite directions—anti-parallel—which constitutes antiferromagnetic coupling.

When reading data as it flies over the rapidly rotating disk, a disk drive's recording head senses the magnetic transitions in the magnetic media that coats the disk. The amplitude of this signal is proportional to the media's "magnetic thickness"—product of the media's remanent magnetic moment density ("Mr") and its physical thickness ("t"). As data densities increase, the media's magnetic thickness (known technically as Mrt) must be decreased proportionately so the closely packed transitions will be sharp enough to be read clearly. For conventional media, this means a decrease in the physical thickness of the media.

The key to AFC media is the anti-parallel alignment of the two magnetic layers across each magnetic transition between two bits. As it flies over a transition, the recording head senses an effective Mrt of the composite structure ($Mrt_{eff}$) that is the difference in Mrt values for each of the two magnetic layers:

$$Mrt_{eff} = Mrt_{top} - Mrt_{bottom}$$

This property of the AFC media permits its overall Mrt to be reduced—and its data density increased—independently of its overall physical thickness. Thus for a given areal density, the Mrt of the top magnetic layer of AFC media can be relatively large compared with single-layer media, permitting inherently more thermally stable larger grain volumes.

Figure 3:
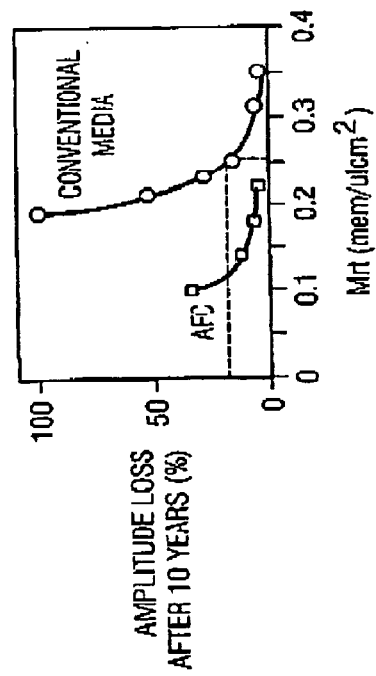
FIG. 3 compares projections made based on measurements of the expected signal amplitude loss after 10 years in conventional single-layer media with that in AFC media.

FIG. 3 compares projections made based on measurements of the expected signal amplitude loss after 10 years in conventional single-layer media with that in AFC media. As the Mrt of the conventional media decreases with reduced film thickness and grain diameter, thermal effects rapidly shrink its magnetic amplitude. This dramatic signal loss is at the heart of the superparamagnetic effect. Acceptable levels of signal decay vary depending on system design but typically range between 10–20%. In comparison, AFC media has the thermal stability of conventional media having about twice its magnetic thickness. In the future, AFC media structures are expected to enable thermally stable data storage at densities of 100 gigabits per square inch and possibly beyond.

Two additional advantages of AFC media are that it can be made using existing production equipment at little or no additional cost, and that its writing and readback characteristics are similar to conventional longitudinal media. The output pulse sensed by the recording head is a superposition of the fields from transitions in both the top and bottom magnetic layers. As with conventional media, this output is detected as a single pulse, so no changes to the disk drive's recording head or electronic data channel components are required.

AFC magnetic media was developed for use in hermetically sealed fixed hard drives. The distance between the read/write head fly over this media is on the order of a micro-inch or $1/40^{th}$ of a micron. The width of data tracks is on the order of 0.75 microns or less. These tiny dimensions and maintaining the ability to both tribologically continuously fly the head at this height and track-follow to these dimension in a removable storage product is perceived to be untractable tasks by others and hence to this point in time no-one else has incorporated this technology in anything other than a hermetically seal fixed hard drive.

Embodiments of the present invention include features in a removable storage cartridge to achieve these specifications, including the use of 2-layer error correction code, this is alternately called "product code," matrix ECC, or DVD like ECC. An example of an error correction code can be found in the co-pending application entitled "Pacing of Data Though Random Access Disk Drive that Incorporates a Two Dimensional Error Code" U.S. application Ser. No. 10/447,923, filed Mar. 29, 2003, which is incorporated by reference herein.

Numerous variations and modifications of the invention will become readily apparent to those skilled in the art. Accordingly, the invention may be embodied in other specific forms without departing from its spirit or essential characteristics.

What is claimed is:

1. An information storage cartridge comprising:
   a magnetic disk typo information storage medium having at least one information storage surface thereon, wherein the information storage surface has an antiferromagnetically coupled data recording layer;
   a motor for rotating the information storage medium in the cartridge; and
   a physical access port to said information storage medium for external insertion of at least one head, wherein the head reading information from and writing information to the information storage surface.

2. The information storage cartridge of claim 1, further comprising a glass substrate for the information storage medium.

3. The information storage cartridge of claim 1, further comprising a metal substrate for said information storage medium.

4. The information storage cartridge of claim 1, further comprising a flexible plastic substrate for said information storage medium.

5. The information storage cartridge of claim 1, further comprising a GMR read element incorporated in said head.

6. The information storage cartridge of claim 1, further comprising a data error correction component implementing dual layer data block correction.

7. The information storage cartridge of claim 1, further comprising an electrical connector on the information storage cartridge.

8. The information storage cartridge of claim 1, further comprising an environmental control element.

9. The information storage cartridge of claim 8, wherein the environmental control element includes an absorbent filter.

10. The information storage cartridge of claim 8, wherein the environmental control element includes a nuclear emitter.

11. The information storage cartridge of claim 1, further comprising a retractable shutter for said physical access port.

12. The information storage cartridge of claim 1, wherein data tracks on said information storage medium have a width of 0.75 microns or less.

* * * * *